Dec. 18, 1928.
J. J. STOETZEL
1,695,785
PRESSURE VACUUM SYSTEM OF PNEUMATIC DISPATCH
Filed May 13, 1926 4 Sheets-Sheet 2
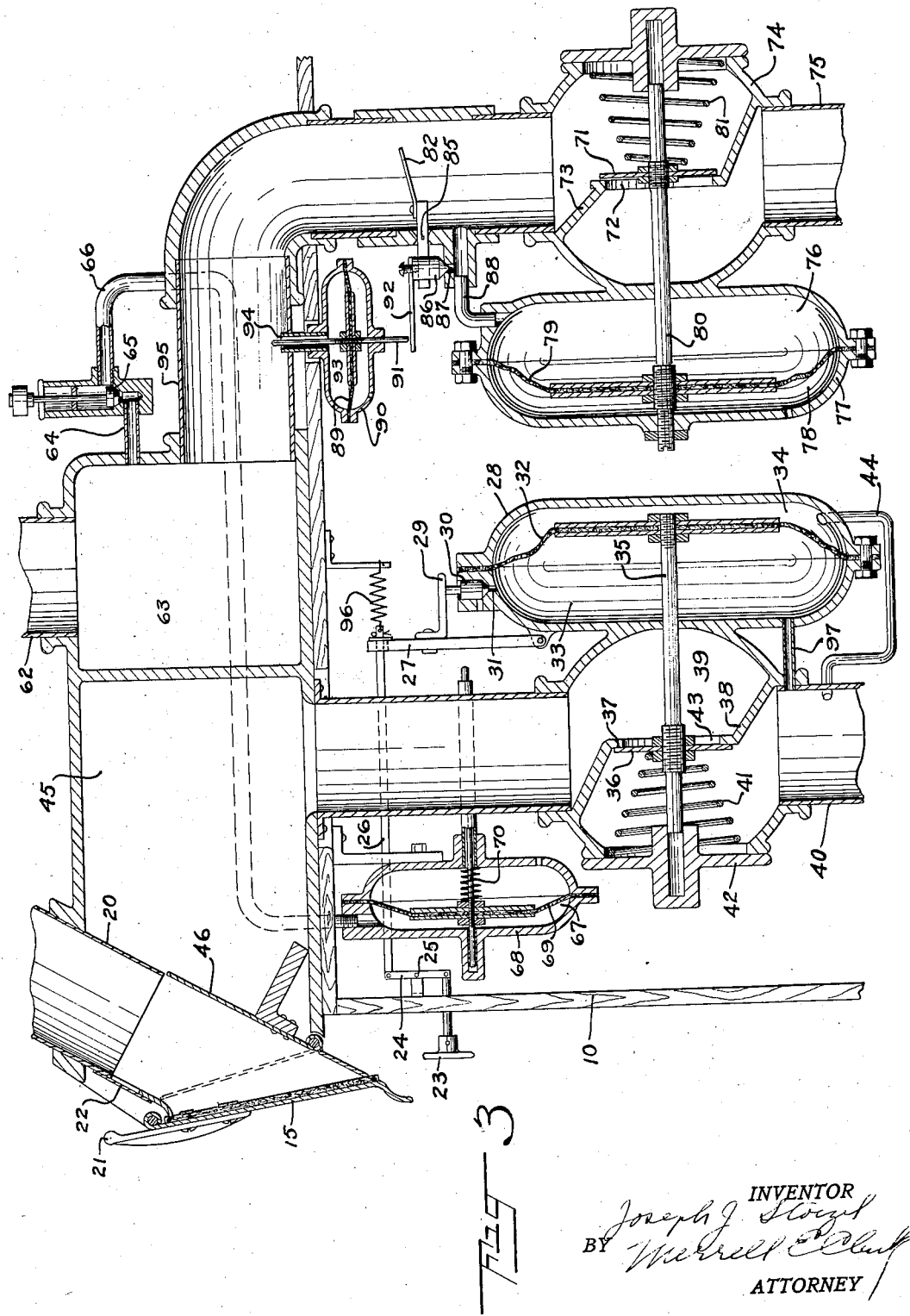
INVENTOR
Joseph J. Stoetzel
BY
ATTORNEY

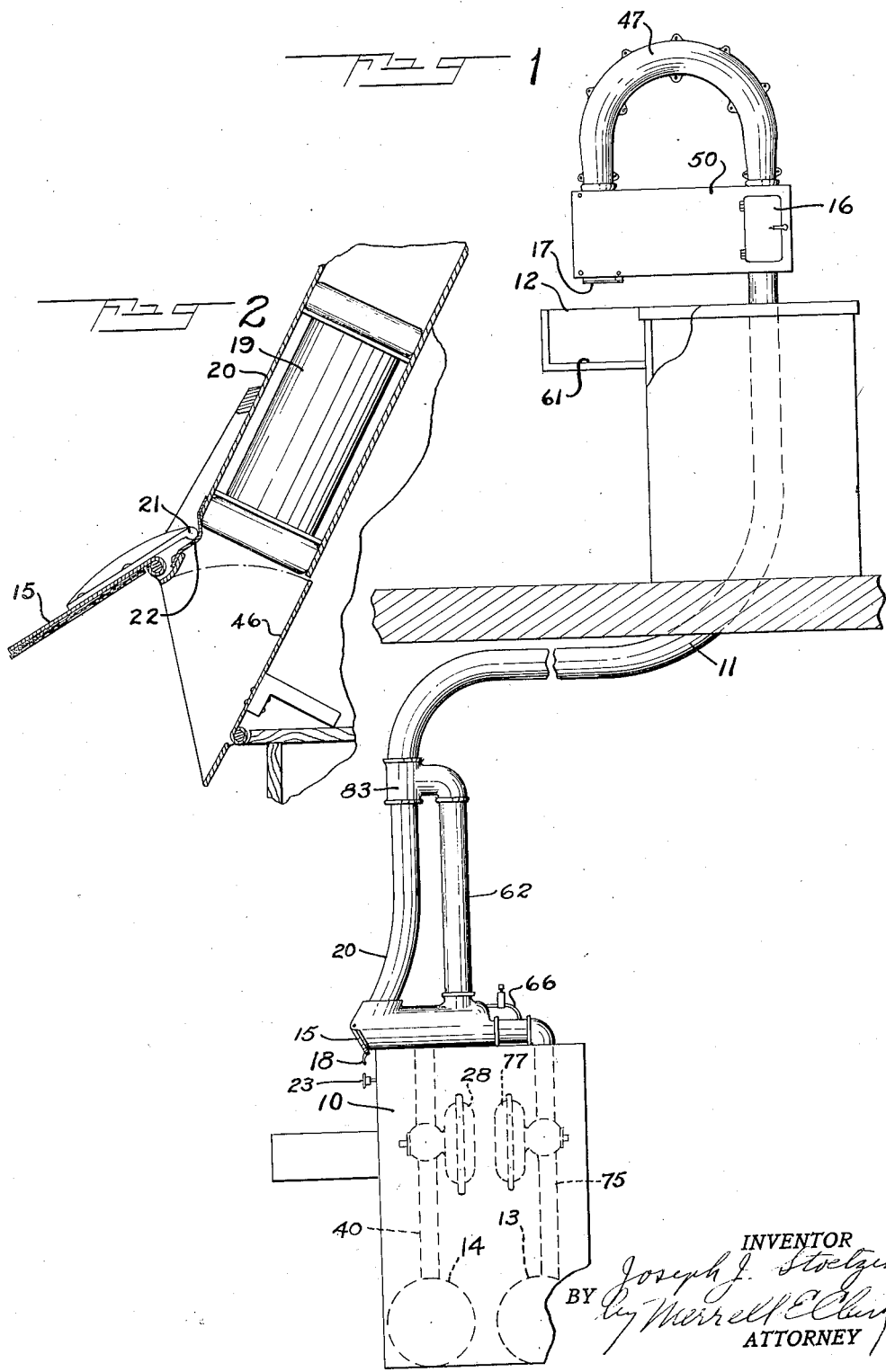

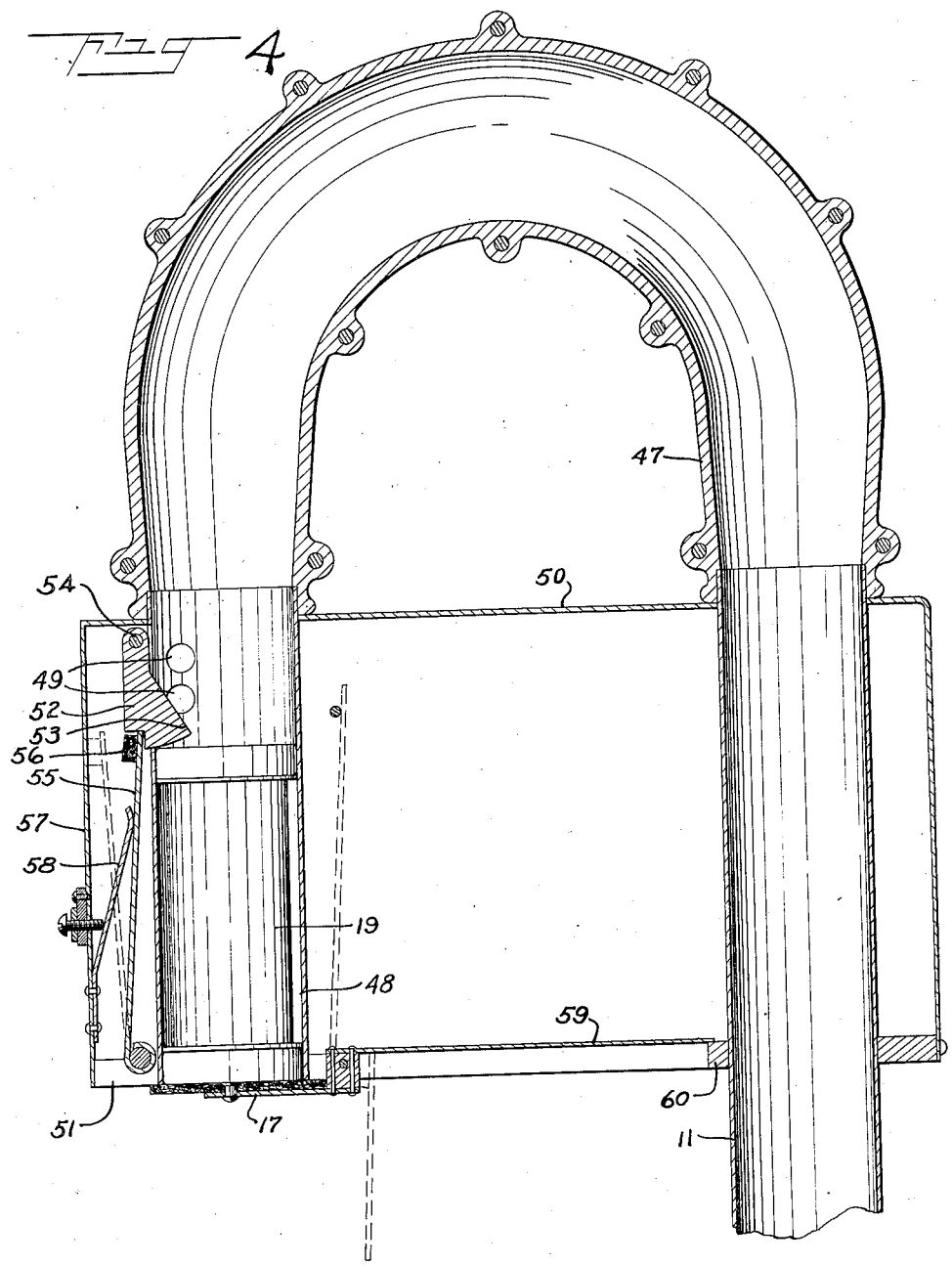

Dec. 18, 1928.
J. J. STOETZEL
1,695,785
PRESSURE VACUUM SYSTEM OF PNEUMATIC DISPATCH
Filed May 13, 1926     4 Sheets-Sheet 4
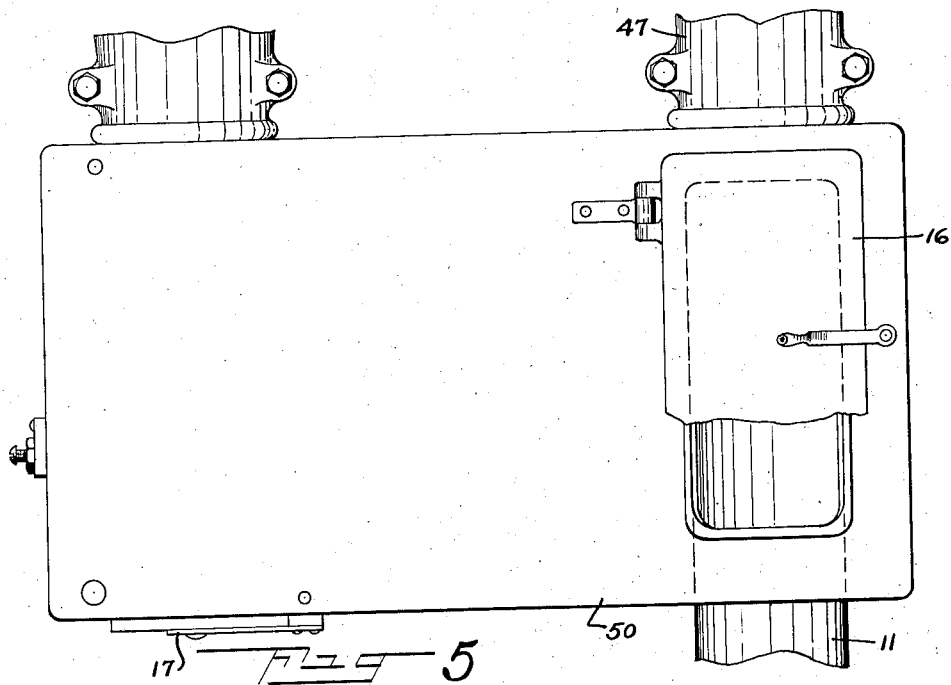
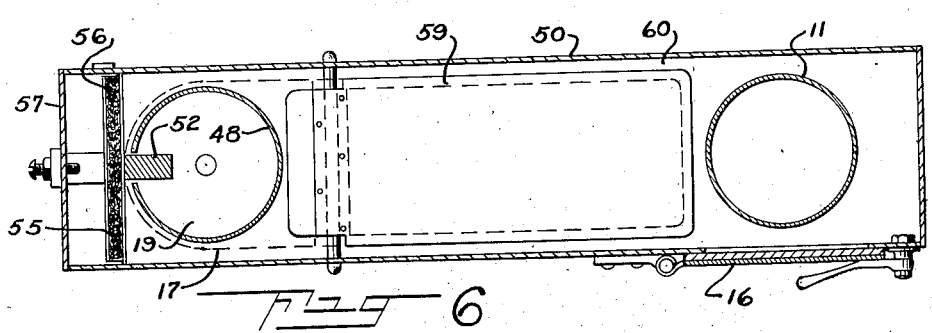
INVENTOR
Joseph J. Stoetzel
BY Merrell E. Clark
ATTORNEY Patented Dec. 18, 1928.

1,695,785

UNITED STATES PATENT OFFICE.

JOSEPH J. STOETZEL, OF BELLAIRE, NEW YORK, ASSIGNOR TO G. & G. ATLAS SYSTEMS, INC., OF NEW YORK, N. Y., A CORPORATION OF NEW YORK.

PRESSURE-VACUUM SYSTEM OF PNEUMATIC DISPATCH.

Application filed May 13, 1926. Serial No. 108,711.

This invention relates generally to pneumatic dispatch apparatus and more particularly to pneumatic dispatch apparatus in which the carriers are dispatched in either direction over a single line of tubing.

A general object of the invention is to provide a pneumatic dispatch system of the single-tube transmission line type referred to in which a saving of power is effected by automatically shutting off the carrier-impelling flow of air at the termination of the travel of a carrier in either direction through the tube.

The invention includes means for producing a pressure condition for causing the carriers to be moved in one direction through the tube and a vacuum condition for moving the carriers in the opposite direction, the vacuum or suction source being normally connected to the line to provide a minimum flow of air therethrough when carriers are not being dispatched. The minimum air flow thus provided is utilized in the automatic supply and shutting off of a carrier-transporting flow of air simultaneously respectively with the insertion of a carrier in or its discharge from the dispatch line.

A feature of the invention resides in the provision of means for manually initiating the operation of the pressure flow for moving carriers in the opposite direction and for automatically shutting off the flow of air when the carrier has completed its journey through the tube line.

In general, pneumatic dispatch apparatus has been provided characterized by a single transmission tube line over which carriers are moved in either direction through the application of pressure or vacuum forces, and in which the flow of air is diminished to a substantially negligible amount as a carrier is discharged from either end of the tube.

Other features of the invention will be hereinafter referred to.

In the drawings, in which a preferred embodiment of the invention has been selected for illustration, Figure 1 is a diagrammatic view showing a pneumatic dispatch system embodying the invention.

Figure 2 is a sectional view on an enlarged scale showing a terminal portion of the transmission line.

Figure 3 is a sectional view on an enlarged scale showing valve means for automatically controlling the operation of the line.

Figure 4 is a sectional view on an enlarged scale showing the other terminus of the transmission line.

Figure 5 is a view in side elevation of a portion of the device shown in Figure 4.

Figure 6 is a view in horizontal section of the parts shown in Figure 5.

Referring to the drawings for a more detailed description of the invention, in Figure 1 is shown an operating unit of a pneumatic dispatch installation embodying the invention, in which a station 10 has a single tube carrier line connection 11 with a distant station 12. Means are provided for applying either a source of exhaust 13 or a source of pressure 14 to one end of the line, as at station 10, to thereby convey carriers in either direction through the line.

At station 10 the terminus of the line 11 is provided with a hinged gate member 15, the port controlled by the gate 15 serving both for an entry port through which carriers are introduced into the line and for a discharge port through which carriers are delivered from the line. At station 12 a carrier receiving gate is shown at 16 while a discharge gate 17 covers an exit port through which carriers are delivered under the pressure of air supplied from the source of pressure 14.

In order to transmit a carrier from station 10 to station 12 the hinged gate member 15 is swung to the open position shown in Figure 2 through the engagement of a finger of the operator with the handle member 18. A carrier 19 is then inserted within the terminal portion 20 of the transmission line 11, the carrier being held from return through the opening pending the application of pressure fluid thereto through the engagement of a stop member 21 with a flexible section 22 immediately at the end of the tube terminal 20. It will be seen that the stop member 21 is thus placed against the rearmost end of the carrier 19 to hold the same within the tube terminal portion 20.

Following the insertion of the carrier within the tube the gate member 15 is permitted to swing to closed position and a pressure control member 23 is pushed inwardly either before or after the closing of the gate member 15 to apply pressure fluid to the carrier member 19 and cause the same to be propelled through the tube 11 to the distant station 12. The manipulation of the control member 23 produces a rocking movement of a link member 24 about its pivot 25 and thereby asserts a pull on a rod 26 having a one-way engagement with an arm 27 pivotally supported on the wall of a pressure control chamber 28. The arm 27 is provided with a detent 29 which normally engages a valve member 30 and holds the valve in closed position with relation to an exhaust port 31 formed in the wall of the chamber 28. The pressure control chamber 28 is provided with a diaphragm 32 which separates the chamber into two compartments 33 and 34, the compartment 33 being provided with the outlet port 31 already referred to.

The diaphragm 32 is connected at its mid portion with a longitudinally movable stem or shaft 35 which supports a valve member 36 cooperating with a seat 37 formed on a septum 38 provided in a valve chamber 39. The valve chamber 39 is interposed in a pipe 40 communicating with the pressure cylinder 14 already referred to. A spring member 41 is interposed between a closure cap 42 provided by the valve chamber 39 and the valve carried by the valve member 36, the spring tending to hold the valve member 36 in closed relation with the seat 37 to thereby close the port 43 provided in the septum 38.

With the construction described the operation of supplying pressure fluid to the tube 11 to propel a carrier therethrough includes the release of the valve member 30 which provides communication between the compartment 33 in the valve chamber 38 and atmosphere. When this has taken place pressure fluid supplied to the compartment 34 through a by-pass 44 extending between the compartment 34 and the pressure supply pipe 40 acts on the diaphragm 32 and moves the valve stem 35 to the left thereby unseating the valve 36 and permitting the flow of pressure fluid from the pipe 40 into a chamber 45. The pressure thus created in the chamber 45 is applied to a pivoted gate member 46 which thereupon swings to the dotted-line position shown in Figure 3 of the drawings and provides access of the pressure fluid to the adjacent end of the carrier 19 which has been previously placed in position in the entrance end 20 of the transmission tube.

The carrier 19 is thereupon propelled through the tube 11 and through the curved section 47 to the downwardly extending discharge portion 48 which is closed by the discharge gate member 17 already referred to.

The travel of the carrier through the tube 11 toward the discharge end thereof operates to produce a moving column of air in advance of the carrier which discharges through ports 49 provided for the purpose in the terminal member 48 into a chamber 50 and thence through a discharge outlet 51 to atmosphere. However, as the carrier emerges from the curved head portion 47 of the tube into the terminal member 48, a trip member 52 having a cam surface 53 is engaged by the carrier and swung to the left about its pivotal support 54 to thereby engage and move a hinged closure member 55 from the full-line to the dotted-line position shown in Figure 4 of the drawing. The closure member 55 is provided with a body 56 of soft rubber or the like which is adapted to engage the end wall 57 of the chamber 50 to provide airtight engagement therewith which prevents momentarily the further discharge of air through the port 51. The carrier 19 thereupon enters the terminal member 48 under a braking or dash-pot effect which checks the travel of the carrier and the column of air at its rear. The effect of this is to produce a pressure surge or impulse in the column of air in the transmission tube 11 which is applied in the apparatus at station 10 to cut off the further supply of pressure fluid to the tube 11 from the source 14.

After the subsidence of the pressure surge or impulse a spring member 58 acts to swing the closure member 55 to its full-line position shown in Figure 4 whereupon the diminution of pressure in the chamber 50 which follows the cutting off of pressure referred to permits a vane member 59 extending rearwardly from the gate member 17 and which normally acts to close a port 60 in the lower wall of the chamber 50, to swing inwardly to the dotted-line position shown in Figure 4 thereby permitting the opening or downward swinging of the gate member 17 and allowing the carrier 19 to drop through the discharge port into a receptacle 61.

The surge or pressure impulse which was created in the manner described in the transmission tube 11 is transmitted through a branch tube member 62 into a chamber 63 and thence through a conduit 64 into engagement with the lower surface of a weighted valve member 65 controlling a connection between the conduit 64 and a conduit 66 leading to a compartment 67 in a valve chamber 68. The valve chamber 68 is equipped with a diaphragm 69 which is carried by a longitudinally movable rod 70 arranged to engage the arm 27 and thereby press the valve 30 to its closed position with reference to the port 31 in the compartment 33 of the control valve chamber 28.

It will be seen that this operation restores the condition of the parts to that obtaining before the control member 23 was actuated to initiate the supply of pressure fluid to the tube 11. Pressure fluid is now supplied through a conduit 97 from a supply conduit 40 to the compartment 33 and this pressure exerted against the diaphragm 32 and added to that exerted by the spring 41 moves the valve 36 to its seat and thereby stops the flow of fluid from the conduit 40 to the tube 11. The drop in pressure which is thus produced in the tube system permits the carrier 19 to tilt the valve 17—59 to discharging position.

It will be seen that previous to the restoration of the valve 30 to its closed position the actuating rod 26 connected to the control member 23 was restored to its normal position through the pull of a spring 96, the one-way connection provided between the rod 26 and the arm 27 providing for this independent resetting of the control member 23 and its connected parts.

It will thus be seen that upon the completion of the travel of a carrier from the station 10 under the propulsion of pressure fluid, a cutting off of the supply of pressure fluid to the transmission tube is automatically accomplished.

The operation of the apparatus in the transmission of a carrier through the line 11 from the station 12 to the station 10 will now be described. The source of exhaust 13 is so connected to the tube line 11 that a relatively restricted flow of air is normally produced in the tube line in the absence of a carrier by way of the air inlet ports 51 and 49 in the terminal 47. This is effected by the relation of a valve member 71 to a port 72 in a septum 73 in the valve chamber 74 which controls a conduit 75 providing communication between the source of exhaust 13 and the chamber 63 already referred to. In order to provide the normal restricted flow of air through the tube 11 the valve 71 is normally spaced slightly from its seat in the septum 73 to thereby permit a restricted flow of air around the valve and through the port 72.

In order to transmit a carrier through the line 11 in response to the connection of the line with the source of exhaust, the inlet gate 16 at the station 12 is opened and a carrier is inserted through the opening thus provided into the tube 11. The presence of the carrier in the tube 11 acts to check the flow of air through the tube with the result that a vacuum or pressure drop is formed in the tube ahead of the carrier by the continued withdrawal of a thin stream of air through the passage around the valve 71. The pressure drop or vacuum thus formed, quickly reaches a point where air is drawn from a compartment 76 in a valve control chamber 77 thereby permitting atmospheric pressure present in the compartment 78 to act on a diaphragm 79 connected with a valve stem 80 on which the valve member 71 is mounted. The valve is accordingly pressed to the right from its seat in Figure 3 against the pressure of the spring 81, thereby opening the port 72 to apply the full force of the vacuum present in the conduit 75 to the connected branch conduit 62 and the transmission line 11. The vacuum thus produced ahead of the carrier 19 permits the atmospheric pressure acting on the trailing end of the carrier to propel the same through the transmission tube 11 to the station 10.

Immediately following the discharge of the carrier through the gate 15 following the movement of the same through the tube in response to the connection of the source of vacuum 13 with the tube 11, the apparatus functions to cut off communication of the tube 11 with the source of vacuum to thereby conserve the vacuum force and insure economy of operation of the apparatus. The means provided for automatically effecting the discontinuance of the propelling stream includes a control member 82 projecting into the conduit 75 and responsive to the rush of air through the conduit which invariably accompanies the movement of the carrier past the junction point 83 of the branch conduit 62 with the transmission line 11. The control member 82 is pivoted at 85 in the wall of the conduit 75 and rocks about this pivot in response to the rush of air referred to, thereby lifting a valve member 86 from closing relation with a port 87 in the conduit 88 connecting the compartment 76 with the conduit 75. The lifting of the valve 86 establishes communication between the compartment 76 and atmosphere and thereby permits the spring 81 to operate to move the valve member 71 to its normal substantially closed position.

In order to insure that the control member 82 will not be moved or operated except when a kinetic impulse or rush of air takes place immediately following the travel of a carrier from station 12 to station 10, a diaphragm 89 is provided in a chamber 90 and supports a rod 91 which normally engages an arm 92 projecting from the valve member 86. The diaphragm 89 is subject to pressure conditions in the compartment 93 of the chamber 90 which is in communication through a conduit 94 with the interior of a tube section 95 connecting the upper end of the conduit 75 with the chamber 63. With this construction the pressure surge following the movement of a carrier from station 10 to station 12 cannot effect the control member 82 since the pressure also acts upon the diaphragm 89 which functions to hold the valve 86 in closed condition in engagement with its seat. This prevents pressure fluid from lifting the valve 86 and escaping at port 87 to produce a diminished pressure and the objectional noise of escaping air.

It will thus be seen that a pneumatic tube apparatus has been provided in which a single tube line serves as a transmission line for carriers moving in both directions between the connected stations and in which pressure which is created by the arrival of the carrier at the discharge end of the tube when traveling in either direction is utilized to automatically shut off the carrier propelling flow of air and to re-establish the normal restricted flow which obtains when the transmission line is not occupied by a carrier.

What I claim is:—

1. In pneumatic dispatch apparatus, a carrier transmitting line, means for causing a carrier-propelling flow of air under pressure through said line, a normally closed gate at the outlet of said line, a by-pass around said gate through which air in advance of a carrier being transmitted can escape, means actuated by the carrier as it approaches said outlet for temporarily cutting off said by-pass thereby causing a pressure surge in the line, and means operated by said pressure surge for cutting off said carrier-propelling flow.

2. In pneumatic dispatch apparatus, a carrier transmitting line, means for causing a carrier-propelling flow of air under pressure through said line, a gate at the outlet line, means for holding said gate closed while the carrier-propelling flow continues, a by-pass around said gate through which air in advance of a carrier being transmitted can escape, means actuated by the carrier as it approaches said outlet for temporarily cutting off said by-pass thereby causing a pressure surge in the line, and means operated by said pressure surge for cutting off said carrier-propelling flow, the cutting off of the flow permitting the opening of the gate and the exit of the carrier.

3. In a pneumatic dispatch apparatus, a carrier transmitting line, means connected thereto for applying pressure or vacuum conditions to the line to produce a flow of air to cause a carrier to travel therethrough in either direction, means for automatically cutting off the vacuum-produced flow upon the exit of a vacuum-propelled carrier from the line, said means including a vane-operated valve adapted to be opened by the rush of air incident to the exit of the carrier, means for automatically cutting off the pressure-produced flow as a pressure-propelled carrier approaches its exit, said last mentioned means including a device for producing a pressure surge in the line, and means for preventing said pressure surge from opening said vane-operated valve.

Signed at New York, in the county and State of New York, this 6 day of May, 1926.

JOSEPH J. STOETZEL.